United States Patent [19]
Zeeh et al.

[11] 3,856,501
[45] Dec. 24, 1974

[54] AGENT FOR CONTROLLING THE GROWTH OF PLANTS

[75] Inventors: Bernd Zeeh, Ludwigshafen; Johann Jung, Limburgerhof; Costin Rentzea, Heidelberg, all of Germany

[73] Assignee: Badische Anilin- & Soda-Fabrik Aktiengesellschaft, Ludwigshafen/Rhein, Germany

[22] Filed: Mar. 22, 1973

[21] Appl. No.: 343,627

[30]   Foreign Application Priority Data
  Apr. 13, 1972   Germany............................ 2217697

[52] U.S. Cl.............................. 71/76, 71/90, 71/91
[51] Int. Cl........................................ A01n 9/14

[58] Field of Search............................ 71/90, 91, 76

[56]            References Cited
          UNITED STATES PATENTS
3,066,149   11/1962   Slezak et al............................ 71/90
3,658,844   4/1972    Lindsay................................. 71/90

*Primary Examiner*—Lewis Gotts
*Assistant Examiner*—Catherine L. Mills
*Attorney, Agent, or Firm*—Johnston, Keil, Thompson & Shurtleff

[57]            ABSTRACT

Agent for controlling the growth of plants containing cyclic sulfonium compounds, and a process for regulating plant growth with these compounds.

10 Claims, No Drawings

AGENT FOR CONTROLLING THE GROWTH OF PLANTS

The present invention relates to agents for controlling plant growth containing as active ingredients cyclic sulfonium compounds and the use of these compounds for regulating plant growth.

It is known to use nitrogenous compounds such as chlorocholine chloride (CCC) (J. Biol. Chem., 235, 475, 1960) and 1-(β-chloroethyl)-1,1-dimethylhydrazinium chloride (CMH) (Naturwissenschaften, 55, 217, 1968, and R. Wegler, Chemie der Pflanzenschutz- und Schaedlingsbekaempfungsmittel, 2, 324, Springer-Verlag, Berlin, 1970) for influencing the growth of plants. These compounds have an effect on the physiology of plant growth and may therefore be employed as plant growth regulators.

One of the typical effects of plant growth regulators is a reduction in plant height. Similarly, seed germination may be stimulated or flowering induced, i. e., it is possible to influence the plant's natural rhythm. Plant growth regulators can also promote or inhibit tillering.

Of economic interest is for example the minimization of lodging in cereals, and the slowing down of grass growth on verges and lawns, thus reducing mowing frequency.

When prior art plant growth regulators are used for instance on cereals to compact the plant stem to reduce lodging, their action is poor.

We have now found that compounds of the formula

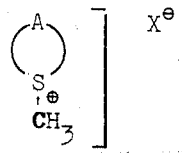

where $X^-$ denotes the anion of an inorganic or organic but not phytotoxic acid, preferably bromide or chloride and A denotes a chain which may be substituted by chlorine and has the structures —$(CH_2)_5$—
—$(CH_2)_3$—CHCl—$CH_2$—
—$(CH_2)_2$—CH=CH—$CH_2$—
—$(CH_2)_2$—S—$(CH_2)_2$—
—$(CH_2)_2$—SO—$(CH_2)_2$—
—$(CH_2)_2$—$SO_2$—$(CH_2)_2$—
—$(CH_2)_n$—S—$CH_2$— where
n = 2 or 3, or,
—$CH_2$—S—$CH_2$—S—$CH_2$— have a better growth-regulating effect on numerous plants than prior art compounds, a feature which manifests itself in some plants in a reduction or stunting of growth height.

The compounds may also be employed together with other plant protection agents, e.g., herbicides, insecticides, and especially fungicides. It is of significance in practice to use the salts together with fertilizers, particularly ureas.

The action of the compounds of the invention is particularly in evidence in cereals, e.g., wheat, rye, barley, rice and oats; dicotyledons, e.g., potatoes, tomatoes, vines and cotton; and various ornamentals, e.g., poinsettia and hibiscus. The treated plants exhibit a compact habit and darker leaf coloration.

The activity of the compounds is attributable to the cation, so that practically any anion may be used. However, anions of phytotoxic acids should not be employed if the intention is only to influence plant growth and not to kill the plants. Examples of suitable acids are hydrochloric acid, hydrobromic acid, sulfuric acid, carbonic acid, nitric acid, phosphoric acid, acetic acid, propionic acid, benzoic acid, monomethyl, and monoethyl ester of sulfuric acid, 2-ethylhexanoic acid, acrylic acid, maleic acid, succinic acid, adipic acid, formic acid, chloroacetic acid, p-toluenesulfonic acid, and benzenesulfonic acid.

The compounds may be applied to the plants through the soil, i.e., are taken up through the roots, or by spraying the plant leaves. In addition to soil and foliage application, the seed may be treated. As a result of the comparatively good crop plant compatibility, the application rate may vary considerably, rising for instance up to 15 kg of active ingredient per hectare. However, rates of 0.5 to 8 kg/ha are normally sufficient.

Examples of compounds to be employed in accordance with the invention are the sulfonium salts listed below:

| Cation | anion | melting point (°C) | literature |
|---|---|---|---|
| 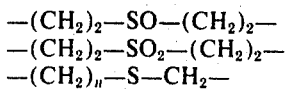 | $Br^-$ | 225[+]) | - |
| 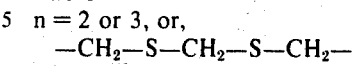 | $Br^-$ | 193 | - |
| 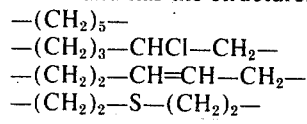 | $I^-$ | 175 | 1a, b, c |
| | $Br^-$ | 240[++]) | - |
| | $Cl^-$ | 225 | 1a |
| | $NO_3^-$ | 172 | 2 |
| | $SO_4^-$ | 127[++]) | 2 |
| OS⟨ ⟩$S^+$—$CH_3$ | $I^-$ | 187 | 3 |
| | $Br^-$ | 181 to 184 | 4 |

| Cation | anion | melting point (°C) | literature |
|---|---|---|---|
| $O_2S\langle\phantom{x}\rangle S^{\oplus}-CH_3$ | $Br^{\ominus}$ | 180+) | - |
| $S{-}\langle\phantom{x}\rangle S^{\oplus}-CH_3$ | $I^{\ominus}$ | 125 | - |
|  | $Br^{\ominus}$ | 120 to 122 | - |
| $S{-}\langle\phantom{x}\rangle S^{\oplus}-CH_3$ | $I^{\ominus}$ | 85 to 86+) | - |
|  | $Br^{\ominus}$ |  | - |
| $Cl{-}S\langle\phantom{x}\rangle S^{\oplus}-CH_3$ | $I^{\ominus}$ |  | 5 |
| $\langle\phantom{x}\rangle S^{\oplus}-CH_3$ | $Cl^{\ominus}$ | (markedly hygroscopic) | - |

+) decomposition point
++) sublimation point
1a. W. Mansfeld, Chem. Ber., 19, 2658–68, 1886;
1b. C. D. Nenitzescu and N. Scarlatescu, Chem. Ber., 67 B, 1142–4, 1934;
1c. A. E. Arbuzov and U. M. Zoroastrova, Izvest. Akad. Nauk S.S.S.R. Otdel Khim. Nauk, 1952, 453–8 (Chem. Abstr. 47, 4833, 1953);
2. O. Masson, J. Chem. Soc., 49, 233–49, 1886;
3. E. V. Bell and G. M. Bennett, J. Chem. Soc., 1928, 86–92;
4. D. Stromholm, Chem. Ber., 33, 823–41, 1900;
5. S. W. Lee and G. Dougherty, J. Org. Chem., 4, 48–53, 1939.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150°C, e.g. tetrahydronaphthalene or alkylated naphthalenes, or organic liquids having boiling points higher than 150°C and having one or more than one functional group, e.g., the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., kieselguhr, talc, clay or fertilizers. It is also possible to prepare granules, e.g., in admixture with fertilizers.

The example below describes the preparation of 1-methyl-1,4-dithianium bromide. Other methyl-substituted sulfonium salts may also be synthesized by this method.

EXAMPLE 1

7 parts (by weight) of a 5N methyl bromide solution in acetonitrile is added to 3 parts of 1,4-dithiane in 80 parts of acetonitrile. After 3 days the precipitate which has formed is suction filtered and dried. There is obtained 2 parts of pure 1-methyl-1,4-dithianium bromide which sublimates in an open melting point tube at 240°C without leaving a residue. 2 more parts of product may be obtained from the mother liquor by concentration.

The biological action of the new agents is described in the following examples.

EXAMPLE 2

Rye grains of the "Petkuser" variety were sown in loamy sandy soil in Neubauer dishes having a diameter of 12 cm. The active ingredients were sprayed in aqueous solution onto the surface of the soil immediately after sowing at application rates of 0.5 mg, 3 mg, 6 mg and 12 mg per dish, corresponding to 0.5, 3, 6 and 12 kg per hectare. For comparison purposes there were used an untreated control dish and dishes treated at the same rates with N-dimethyl-N-(β-chloroethyl)-hydrazinium chloride (CMH). The experiment was carried out under greenhouse conditions; the growth height after 20 days is given in the following table.

| Active ingredient | Relative growth height at active ingredient concentrations of | | | |
|---|---|---|---|---|
|  | 0.5 mg/dish | 3 mg/dish | 6 mg/dish | 12 mg/dish |
| Control (untreated) | 100 | 100 | 100 | 100 |
| CMH | 91 | 88 | 88 | 85 |
| 1-methyl-1,4-dithianium chloride | 88 | 85 | 84 | 76 |

EXAMPLE 3

Adopting the procedure of Example 2, spring wheat of the "Opal" variety was sown and the soil sprayed immediately after sowing with 6 mg and 12 mg per dish (corresponding to 6 and 12 kg per hectare). The leaves of other wheat plants 10 cm in height were treated with 1.5, 3 and 6 mg per dish (corresponding to 1.5, 3 and 6 kg per hectare). CMH was used for comparison purposes.

The growth height 21 days after treatment of the soil is given below:

| Active ingredient | Relative growth height at active ingredient concentrations of | |
|---|---|---|
| | 6 mg/dish | 12 mg/dish |
| Control (untreated) | 100 | 100 |
| CMH | 74 | 66 |
| 1-methyl-1,4-dithianium chloride | 65 | 56 |
| 1-methyl-3,4-dehydro-1-thiacyclohexanium bromide | 72 | 65 |

In the case of leaf treatment, the following differences in growth height were apparent 13 days after application:

| Active ingredient | Relative growth height at active ingredient concentrations of | | |
|---|---|---|---|
| | 1.5 mg/dish | 3 mg/dish | 6 mg/dish |
| Control (untreated) | 100 | 100 | 100 |
| CMH | 93 | 90 | 86 |
| 1-methyl-1,4-dithianium chloride | 90 | 86 | 83 |
| 1-methyl-3,4-dehydro-1-thiacyclohexanium bromide | 90 | 87 | 85 |

EXAMPLE 4

A further test was carried out with spring barley of the "Breuns Wisa" variety under the same conditions as in Example 2. The active ingredients were applied to the soil (at rates of 1.5, 6 and 12 mg per dish, corresponding to 1.5, 6 and 12 kg per hectare) and to the leaves of other barley plants (at rates of 1.5 and 3 mg per dish, corresponding to 1.5 and 3 kg per hectare).

23 days after the soil treatment the following differences in growth height were observed:

| Active ingredient | Relative growth height at active ingredient concentrations of | | |
|---|---|---|---|
| | 1.5 mg/dish | 6 mg/dish | 12 mg/dish |
| Control (untreated) | 100 | 100 | 100 |
| CMH | 89 | 76 | 75 |
| 1-methyl-1,4-dithianium chloride | 81 | 75 | 71 |

The leaves were treated at a growth height of 10 cm; 12 days after treatment the following differences in growth height were observed:

| Active ingredient | Relative growth height at active ingredient Concentrations of | |
|---|---|---|
| | 1.5 mg/dish | 3 mg/dish |
| Control (untreated) | 100 | 100 |
| CMH | 98 | 98 |
| 1-methyl-1,4-dithianium chloride | 97 | 95 |
| 1-methyl-3,4-dehydro-1-thiacyclohexanium bromide | 97 | 91 |

EXAMPLE 5

90 parts by weight of the compound of Example 1 is mixed with 10 parts by weight of N-methyl-α-pyrrolidone. A mixture is obtained which is suitable for application in the form of very fine drops.

EXAMPLE 6

20 parts by weight of the compound of Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 7

20 parts by weight of the compound of Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

20 parts by weight of the compound of Example 1 is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 9

20 parts by weight of the compound of Example 1 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1 percent by weight of the active ingredient.

EXAMPLE 10

3 parts by weight of the compound of Example 1 is intimately mixed with 97 parts by weight of particulate kaolin. A dust is obtained containing 3 percent by weight of the active ingredient.

EXAMPLE 11

30 parts by weight of the compound of Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

EXAMPLE 12

Spring wheat of the "Opal" variety was sown in light sandy soil in Neubauer dishes. The soil was then immediately sprayed with the active ingredients in amounts of 3 mg and 12 mg per dish (corresponding to 3 and 12 kg per hectare). The results obtained after 18 days are given below:

| Active ingredient | Relative growth height at active ingredient concentrations of | |
|---|---|---|
| | 3 mg/dish | 12 mg/dish |
| Control (untreated) | 100 | 100 |
| CCC | 71 | 66 |
| 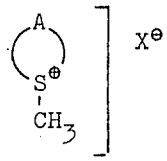 | 64 | 60 |

EXAMPLE 13

Adopting the procedure of Example 12, spring rye of the "Petkuser" variety was sown and treated. The results obtained after 18 days are given below:

| Active ingredient | Relative growth height at active ingredient concentrations of | |
|---|---|---|
| | 2 mg/dish | 12 mg/dish |
| Control (untreated) | 100 | 100 |
| CCC | 94 | 91 |
| 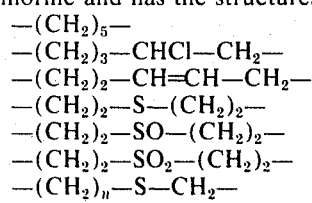 | 87 | 84 |

We claim:
1. A process for stunting plant growth wherein the plants are treated with a plant growth stunting amount of a salt of the formula

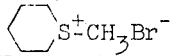

where X⁻ denotes the anion of a non-phytotoxic acid and A denotes a chain which may be substituted by chlorine and has the structures
—(CH₂)₅—
—(CH₂)₃—CHCl—CH₂—
—(CH₂)₂—CH=CH—CH₂—
—(CH₂)₂—S—(CH₂)₂—
—(CH₂)₂—SO—(CH₂)₂—
—(CH₂)₂—SO₂—(CH₂)₂—
—(CH₂)ₙ—S—CH₂—
where n denotes one of the integers 2 and 3, or,
—CH₂—S—CH₂—S—CH₂—.

2. A process as claimed in claim 1 wherein said salt is 1-methyl-1-thiacyclohexanium bromide.
3. A process as claimed in claim 2 wherein said plant growth stunting amount is in the range of 0.5 to 15 kg per hectare.
4. A process as claimed in claim 1 wherein said plant growth stunting amount is in the range of 0.5 to 15 kg per hectare.
5. A process as claimed in claim 1 wherein said plants are cereals.
6. A process for stunting plant growth wherein the host soil for said plants is treated with a plant growth stunting amount of a salt of the formula

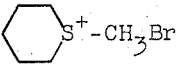

where X⁻ denotes the anion of a non-phytotoxic acid and A denotes a chain which may be substituted by chlorine and has the structures
—(CH₂)₅—
—(CH₂)₃—CHCl—CH₂—
—(CH₂)₂—CH=CH—CH₂—
—(CH₂)₂—S—(CH₂)₂—
—(CH₂)₂—SO—(CH₂)₂—
—(CH₂)₂—SO₂—(CH₂)₂—
—(CH₂)ₙ—S—CH₂—
where n denotes one of the integers 2 and 3, or,
—CH₂—S—CH₂—S—CH₂—.

7. A process as claimed in claim 6 wherein said salt is 1-methyl-1-thiacyclohexanium bromide.
8. A process as claimed in claim 7 wherein said plant growth stunting amount is in the range of 0.5 to 15 kg per hectare.
9. A process as claimed in claim 6 wherein said plant growth stunting amount is in the range of 0.5 to 15 kg per hectare.
10. A process as claimed in claim 6 wherein said plants are cereals.

* * * * *